April 28, 1953

C. G. RICE 2,636,590

ATTACHMENT FOR TYPEWRITERS FOR MAKING
MULTIPLE COPIES BY USE OF RIBBON

Filed July 29, 1948

INVENTOR.
CHARLES GORDON RICE
BY
M. Theodore Simmons
ATTORNEY

April 28, 1953

C. G. RICE 2,636,590

ATTACHMENT FOR TYPEWRITERS FOR MAKING
MULTIPLE COPIES BY USE OF RIBBON

Filed July 29, 1948

INVENTOR.
CHARLES GORDON RICE

BY
M. Theodore Simmons
ATTORNEY

April 28, 1953     C. G. RICE     2,636,590
ATTACHMENT FOR TYPEWRITERS FOR MAKING
MULTIPLE COPIES BY USE OF RIBBON Filed July 29, 1948     5 Sheets-Sheet 3

INVENTOR.
CHARLES GORDON RICE
BY
M. Theodore Simmons
ATTORNEY

April 28, 1953 C. G. RICE 2,636,590
ATTACHMENT FOR TYPEWRITERS FOR MAKING
MULTIPLE COPIES BY USE OF RIBBON
Filed July 29, 1948 5 Sheets-Sheet 4

INVENTOR.
CHARLES GORDON RICE
BY
M. Theodore Simmons
ATTORNEY

April 28, 1953 C. G. RICE 2,636,590
ATTACHMENT FOR TYPEWRITERS FOR MAKING
MULTIPLE COPIES BY USE OF RIBBON
Filed July 29, 1948 5 Sheets-Sheet 5

INVENTOR.
CHARLES GORDON RICE
BY
M. Theodore Simmons
ATTORNEY

Patented Apr. 28, 1953

2,636,590

UNITED STATES PATENT OFFICE 2,636,590

ATTACHMENT FOR TYPEWRITERS FOR MAKING MULTIPLE COPIES BY USE OF RIBBON

Charles Gordon Rice, Fort Lauderdale, Fla.

Application July 29, 1948, Serial No. 41,194

38 Claims. (Cl. 197—153)

This invention relates to attachments for typewriters, and more particularly to attachments for making manifold copies by the use of a ribbon strip.

It has been proposed heretofore to employ ribbon strips, made either of carbon paper or of inked cloth, which strips are positioned between the pages in the writing area of the typewriter, or other writing machine, so that multiple copies are made with the one type impression, but such devices have had one or more objectionable characteristics so that the same have not been wholly practicable and satisfactory in service.

It is one object of this invention to provide a simple, sturdy, "foolproof" and practical construction of attachment for existing typewriters or other writing machines, which attachment carries a supplemental inked ribbon for the making of additional copies of the typed matter.

It is another object of this invention to provide a manifolding attachment which is carried by plates attached to the ends of the platen carriage.

It is another object of this invention to provide a construction of separate manifolding attachment in which the supplemental ribbon stretches across the entire writing line of the platen and is supported adjacent the ends of the platen so that substantially none of the normally available writing space is sacrificed.

It is still another object of this invention to provide a manifolding attachment, having a supplemental inked ribbon, which is wound on ribbon spools located adjacent each end of the carriage, with a selective reversible drive for the ribbon spools in which the ribbon is stationary during the writing of a line and is moved by the return of the carriage to start a new line of writing.

It is a further object of this invention to provide a manifolding attachment which is "universally" adaptable to standard typewriters in that provisions are made for lateral as well as fore and aft and vertical adjustments so as to properly position the ribbon in front of the platen notwithstanding variations in sizes of carriage, platen and other parts.

It is a further object of this invention to provide a manifolding attachment for existing typewriters in which a supplemental ribbon is carried upon a pair of arms which are pivoted to be moved from a horizontal position, in which the ribbon is positioned between pages in the machine, to an upright non-operating position whereby the typewriter may be used for other writing purposes without interference from the attachment.

It is a further object of this invention to provide a manifolding attachment in which special provisions are made to minimize friction drag of the supplemental ribbon when it is being moved to bring "fresh" areas into writing position.

It is a further object of this invention to provide a manifolding attachment which may include a paper holding bail, which bail will be automatically lifted, with the raising of the ribbon carrying arms of the attachment, from a horizontal operating position to an upright position of non-use, and in which the bail may be used independently of use of the attachment, as when the latter is in non-operating position.

It is a further object of this invention to provide a manifolding attachment having auxiliary take-up means for preventing slack in a movable supplemental ribbon stretched between pivoted arms when the arms are moved from an operating to a non-operating position.

Further objects of this invention are to provide a manifolding attachment with a novel drive for the ribbon spool, and with a novel construction of ribbon spool.

Still further objects of this invention are to provide a manifolding attachment with a spring to take up stresses after the ribbon has been unwound from a spool, and to combine such a spring with a ribbon spool.

Still further objects of this invention are to provide a manifolding attachment with protective devices to prevent creeping of the ribbon out of operating position as the paper is moved relatively to the platen and to protect against smudging of the paper by the supplemental ribbon, and to provide novel arrangements for mounting protective wires and to maintain the same under tension.

Still other objects and advantages of my invention will be apparent from this specification.

The features of novelty which I believe to be characteristic of my invention are set forth with particularity in the appended claims. My invention itself, however, both as to its fundamental principles and as to its particular embodiments, will best be understood by reference to the specification and accompanying drawings, in which—

In the embodiment of my invention now to be described, and which is for some purposes the presently preferred embodiment of the invention, the attachment will first be described briefly in a general way to point out the overall organization of the mechanism, after which the various details will be explained separately.

The attachment is mounted on any standard typewriter by means of a pair of mounting plates 11 and 12 (Figs. 1, 2, and particularly Figs. 3 and 4), 11 being the left hand plate and 12 the right hand plate. (Left and right hand, as used herein, means the observer's right and left as he faces the front of the typewriter in typing position.) The plates 11 and 12 are secured to the left and right hand ends of the typewriter carriage, so that the entire attachment rides with the carriage as it moves. The illustrated plates are those designed for the "Royal" typewriter and are to be considered as symbolic only.

Pivoted at the rear of the mounting plates is a tubular housing 19 upon which are fixed left hand arm 13 and right hand arm 14, joined to the housing so that both arms may be swung as a unit from an operating position, in which the arms are substantially horizontal, to a stand-by position, in which the arms are upright.

The arms 13 and 14 are located next to the mounting plates and extend forwardly, terminating over the typewriter platen. At their forward ends, these arms carry supplemental ribbon spools 15 and 16, respectively, and ribbon guides 17 and 18, respectively. Mounted on the ribbon guides are separator or protector wires 21 and 22, which extend parallel to the ribbon 23, above and below it, and slightly spaced from it. The ribbon guides are located near the ends of the typewriter platen and position the ribbon in front of the platen along the writing line. Mounted at the rear right hand side of the attachment is the drive mechanism 25 which moves the supplemental ribbon, and at the rear left is a shifter control mechanism 26 to control the direction of ribbon feed between the spools.

The drive mechanism includes cable 27 having an anchoring clip 28 which may be secured to the frame of the typewriter at any suitable point in the rear. The drive mechanism actuates main drive shaft 31 which, in turn, operates the left and right hand spur shafts 32 and 33, only one of the shafts 32 and 33 being operated at a time, depending on the direction of ribbon movement.

The left hand spur shaft 32 operates the left hand ribbon spool spindle 34, to rotate left hand ribbon spool 15 when that spool is the take-up spool, and the ribbon is moving from right to left. The right hand spur shaft 33 drives right hand ribbon spool 16 when that spool functions as the take-up spool, through mechanism which is a mirror image of the mechanism of the left hand spool drive, and the details of which have been omitted from the drawings for the sake of simplicity. The drive from shaft 31 to shafts 32 and 33 is through pairs of bevel gears 35 and 36 mounted on these shafts respectively, and the drive from shaft 32 to spindle 34 is a motion reducing drive through pinions 37 and 38 mounted on said shafts respectively. It will be understood that similar mechanism is provided on the right hand arm 12 for ribbon spool 16 although, as stated, it is omitted for the sake of simplicity.

Main drive shaft 31 rotates always in a clockwise direction, viewed from the right hand side, and, when driven, the left hand spur shaft rotates clockwise, while the right hand spur shaft rotates counter-clockwise, as viewed from the front of the machine. Selective engagement of main drive shaft 31 with either shaft 32 or shaft 33 is made by longitudinal shifting of the main drive shaft to engage one of the pairs of gears 35 and 36, while disengaging the other, and vice versa. This shifting is accomplished by shifter mechanism 26, to be described later. As will be understood, when the ribbon is being moved from right to left, left arm spur shaft 32 is engaged with main drive shaft 31, and the right arm spur shaft is disengaged, permitting the right hand spool to run "free." When the ribbon is moving from left to right, these conditions are reversed.

*Mounting plates*

Each of the fixed mounting plates 11 and 12 has a pair of depending legs 11a and 12a (Figs. 3 and 4) in which are mounting holes 11b and 12b, respectively. The plates are adapted to be fixed on the outside of the ends of the typewriter carriage by removing a shoulder screw and a nut, normally found on each end thereof, and replacing the same after each plate is aligned with the mountings therefor. The holes 11b and 12b are elliptical, with the major axis horizontal, so as to allow for possible adjustment of the attachment forwardly or backwardly as may be necessary to properly locate the ribbon guides, as will be explained.

Figure 1:
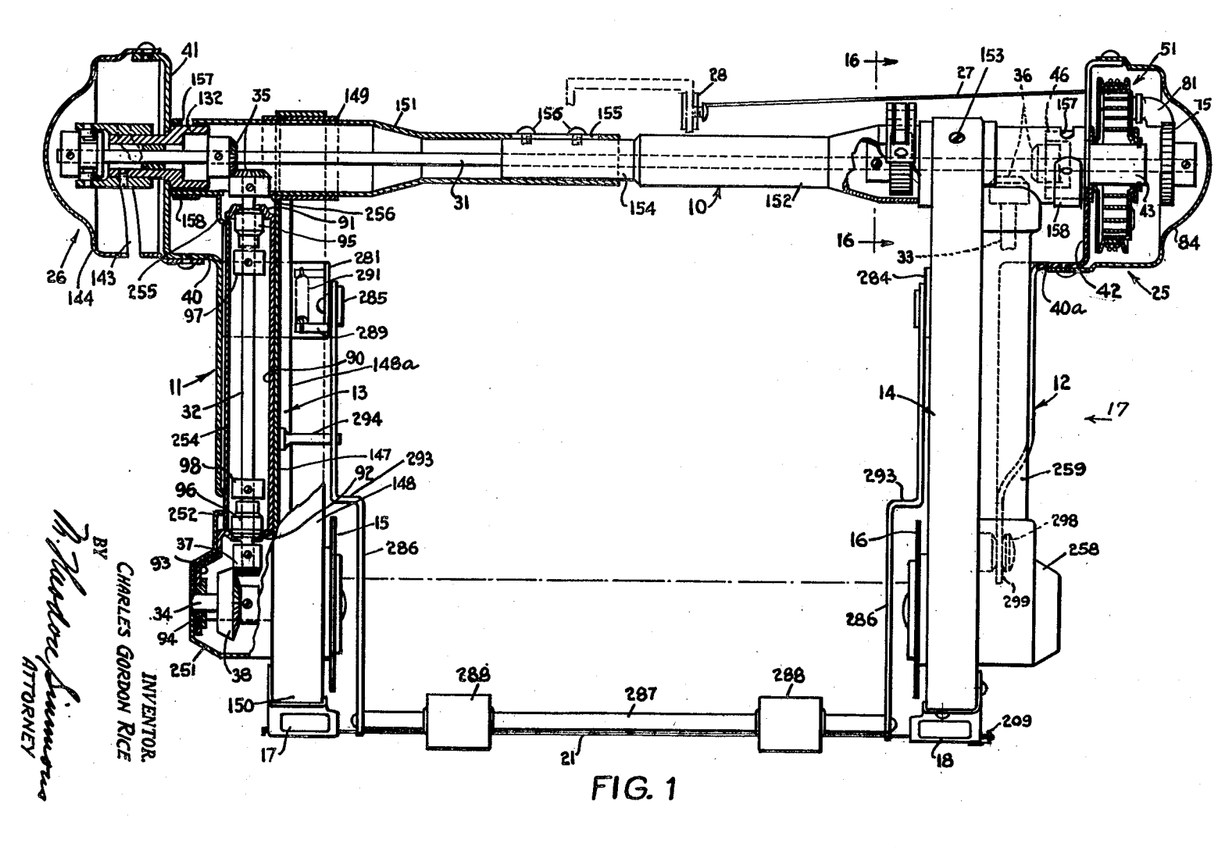
Figure 1 is a plan view of the attachment according to this invention, parts being broken away and sectioned to facilitate the illustration.
Figure 2:
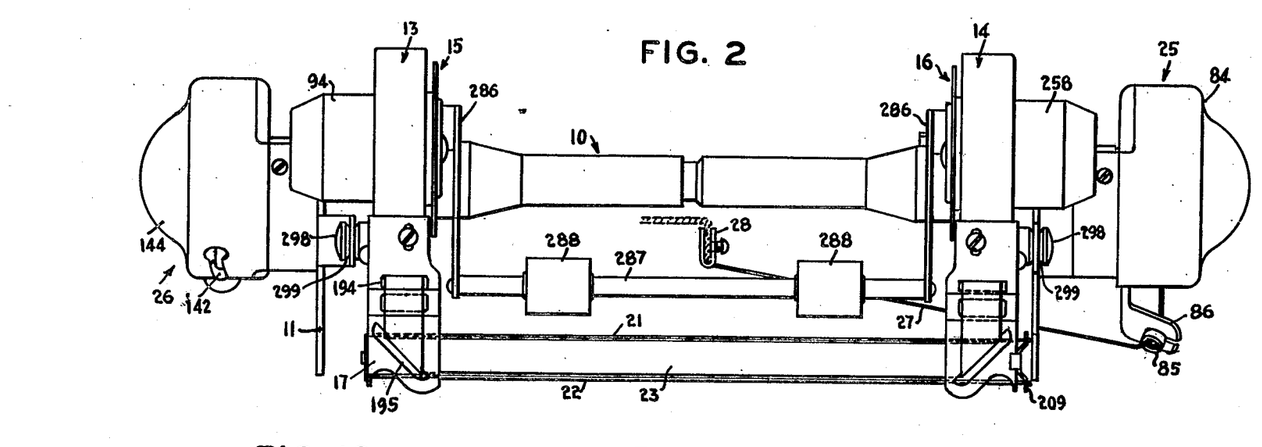
Fig. 2 is a front elevation of the attachment.

The mounting plates have lateral offsets 40 and 40a respectively (Fig. 1). From offset 40 is a rearwardly extending, circular backing plate 41, which is parallel with the carriage end, and there is a similar backing plate 42 connected to offset 40a. In the illustrated embodiment the mechanism of the attachment is mounted upon these backing plates.

Drive mechanism

By drive mechanism is meant the mechanism by which the return movement of the carriage is utilized to turn the main drive shaft 31 to advance the supplemental ribbon along the writing line. This mechanism is designated generally by reference numeral 25, and is shown in enlarged detail in Figs. 5, 6, 7 and 8.

Backing plate 42 of mounting plate 12 carries, in an opening at its center, a housing 43 for main bearing 44 for the main drive shaft 31. The bearing housing 43 has a portion 45 of larger diameter, which fits within the opening of plate 42, and a still larger diameter portion 46, which is counterbored, as shown.

A cable drum, designated generally by reference numeral 51, is rotatably mounted on the outside of main bearing housing 43. The drum has two interfitting cup-shaped portions 52 and 53. The rim of portion 52 is formed into an external groove 54 in which the cable 27 is received so as to be wound on the drum. Pressed inwardly from the bottom of groove 54 are two indentations 56 and 57, which are circular in form. The rim 62 of drum portion 53 fits within the grooved rim 54 of drum portion 52, and is provided with a pair of bayonet slots 63 (Figs. 5 and 6) at points 180° apart to receive the projections 56 and 57, and thus frictionally hold the drum in assembled form. The arrangement is particularly useful when servicing the drive mechanism.

The center of drum part 52 is outwardly offset, as at 58, and the center of drum part 53 is similarly outwardly offset, as at 64. Between the drum 51 and the backing plate 42 is bearing washer 65 and, on the opposite side of the drum, a bearing washer 66. The drum is held in place on bearing housing 43 by split washer 67 engaged in slot 68 in the bearing housing.

The rim of drum portion 53 has a hook shaped projection 71 (Fig. 6) struck inwardly at one point in its circumference.

Within the drum there is provided a flat spring 72, much like the main spring of a clock. The outer end of this spring 72 has a hole by which it is mounted on hook 71, and the other end of this spring carries a button 73 which fits loosely within a hole or socket in bearing housing 43. With this construction, as will be understood, one end of the spring is anchored to the inner surface of the drum periphery and the other end of the spring is anchored to the bearing housing, whereupon rotation of the drum on the bearing housing will wind or unwind the spring.

A ratchet 75 is secured on drive shaft 31, adjacent the drum, by means of set screw 76. Drum part 53 has pressed outwardly therefrom a pair of small mounting platforms 74 and 77. Pivoted at 78 on platform 74 is pawl 81, which is L-shaped and is biased by spring 82 into contact with the teeth of ratchet 75. This spring is fixed on platform 77 on the drum.

Figure 4:
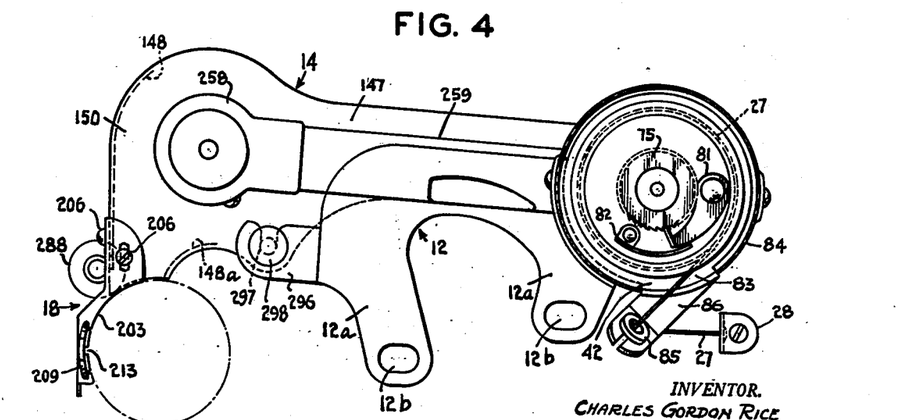
Fig. 4 is an end elevation of the right hand end of the attachment; parts also being broken away and sectioned to facilitate the illustration.
Figures 5, 6, 7, 8, 9, 10, 15:
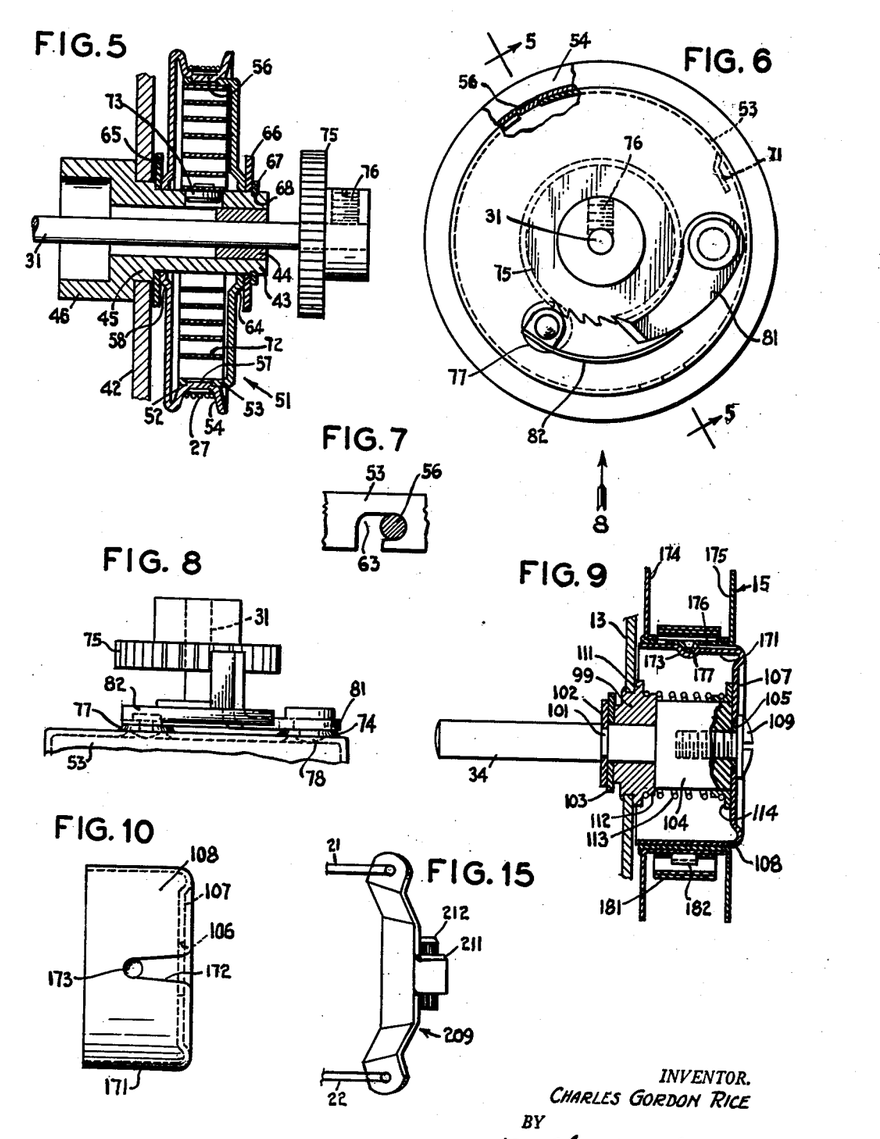
Fig. 5 is a section on the line 5—5 of Fig. 6, illustrating the drive mechanism.
Fig 6 is an end elevation of the drive mechanism of Fig. 5.
Fig. 7 is a fragmentary enlarged detail of the connection of the parts of the drum of the drive mechanism.
Fig. 8 is a fragmentary detail, looking at the drive ratchet mechanism in the direction of arrow 8 in Fig. 6.
Fig. 9 is an enlarged sectional detail of the ribbon spool and its drive and mounting.
Fig. 10 is a detail in plan view of the spool mounting drum.
Fig. 15 is an enlarged detail in perspective of the tensioning spring for the protective wires.

Cable 27 has one end anchored in groove 54 on drum 51. It passes off therefrom through opening 83 (Fig. 4) in cover 84 for this drive mechanism, thence through bushing 85 carried by arm 86 projecting from backing plate 42 and, as already stated, has its other end attached to the frame of the typewriter near the center of the back. The teeth of ratchet 75 are so faced that as the operator types, and as the carriage moves from right to left, spring 72 winds the cable on the drum 51, which thus rotates counter-clockwise, as seen in Fig. 6, and pawl 81 slips over the teeth of ratchet 75 without rotating the same. However, when the carriage is returned to start a new line of writing, the cable is pulled off the drum, thus rotating the drum clockwise and, in this direction, pawl 81 engages in the teeth of ratchet 75, to rotate the ratchet 75 and main drive shaf 31 clockwise, as seen from the right hand side of the machine, and in Fig. 6.

Spool drive

Reverting to Fig. 1, spur shafts 32 and 33 are driven from the pairs of mitre gears 35 and 36, one of each of which pairs is fast on the drive shaft 31, and since the spool drives are alike, only one need be described in detail.

Attachment arm 13 carries a bearing bracket 90 which has spaced apart ears 91 and 92. These ears are pierced and cup-shaped, as shown, to receive shaft 32 and its bearings. Integral with ear 92 is a forward extension 93 in which is supported the bearing 94 for one end of the spool drive spindle 34. Extension 93 is shaped as a housing for the gearing and is also attached to arm 13. Spur shaft 32 has bearing 95 and 96 held in engagement with ears 91 and 92 by collars 97 and 98, to form the bearing support for the spur shaft. Thus, bearing bracket 90 locates positively the bearings for the spur shaft 32 and one of the bearings for the spool spindle shaft 34, and the attaching of extension 93 to arm 13 properly aligns bearing 94 with inner bearing 99 for the spindle 34, all of which insures a proper meshing of the pinion 37 and gear 38 of the gear reduction drive for the spool spindle. Bearing 99 is fixed in arm 13.

The specific spool drive is shown in enlarged detail in Figs. 9 and 10. Spindle 34 has a groove 101 receiving retaining washer 102 with lock washer 103 between it and the outer end of bearing 99. Spindle 34 also has an enlarged head 104, located within the flanges of arm 13, and a protruding mounting lug 105 which is angularly-shaped, as part of the spool drive means. This lug engages in a similarly shaped hole 106 in the recessed end wall 107 of a spool receiving drum 108. Screw 109, or other fastening means, hold the drum fast on lug 105 and spindle 34. By the illustrated and described arrangement spool 15 is positively driven for taking up ribbon, as will be further explained.

At other times the spool functions as a "free" spool, as when ribbon is being fed off the spool in the opposite direction, and at such times it is important that the free spool not over-run so as to pay out more ribbon than is being taken up on spool 16 at that time, as will be described. To this end, spindle bearing 99 has an intermediate flange 111 and another flange 112 at its inner end defining a channel as a seat for one end of coiled spring 113. The opposite end of this spring carries a washer 114, which is similarly channeled and has a flat bottom. The washer is loose on head 104 and slidably bears against the flat bottom or end wall 107 of the drum 108. It will be understood that this spring 113 exerts sufficient drag on the spool mounting drum, and on the spool mounted thereon, to prevent over-running of the spool when "free," and in this operation the bottom of washer 114 slips on the bottom of drum 108.

The construction of drum 108 for the mounting and positioning of the spool will be described hereinafter.

It will be recalled that spool 16 is driven by mechanism which is similar to that just described, except that mitre gears 36 are arranged to drive the spool 16 counterclockwise. The spools are alternately take-up and feed spools, in accordance with the operation of the shifting mechanism.

Shifting mechanism

Figure 11:
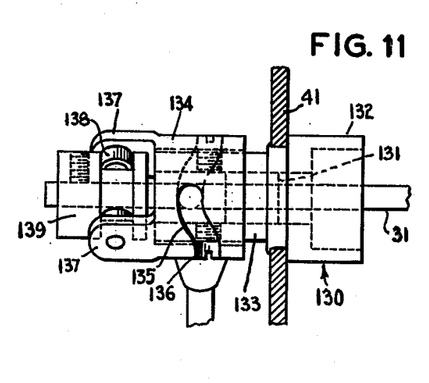
Fig. 11 is an enlarged elevational view of the shifter mechanism.
Figure 12:
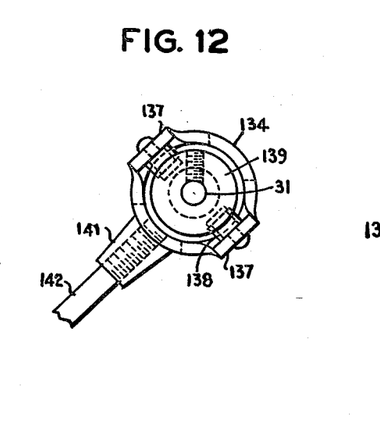
Fig. 12 is an end view of the shifter mechanism of Fig. 11.

This mechanism is seen in Fig. 1 and in enlarged details in Figs. 11 and 12. Backing plate 41 on main mounting plate 11 has fixed therein a housing 130 for main bearing 131 for the shaft 31, this housing being similar in construction and location to main bearing housing 43 for the drive mechanism. Bearing 130 has the enlarged cup-shaped head 132 on the inboard side of plate 41 and the reduced tubular extension 133 on the outboard side of this plate. Sleeve 134 slidably fits over the extension 133 and has a pair of cam slots 135 on opposite sides thereof. A pair of guide pins 136 are secured in the bearing extension 133 and the heads thereof engage in the respective grooves 135. The sleeve 134 has extending outwardly from one end a pair of ears 137 each of which carries a roller 138 which engages in a circumferential groove in collar 139 secured on the outer end of the main drive shaft 31. There is a suitable space between the inner end of collar 139 and the bearing extension 133 to allow for the lateral movement of the collar 139.

Figure 3:
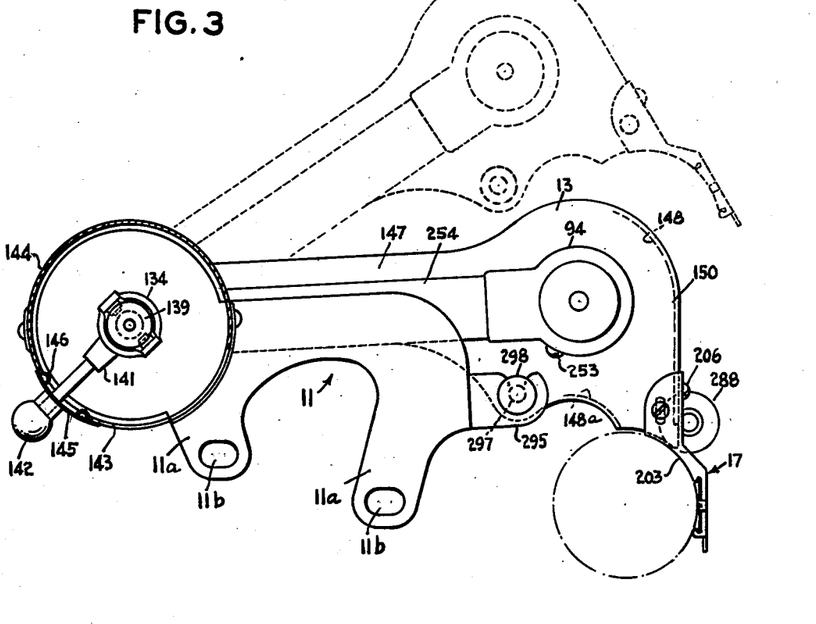
Fig. 3 is an end elevation of the left hand end of the attachment, parts being broken away and sectioned to facilitate the illustration.

Sleeve 134 has an extension 141 (Fig. 12) in which is mounted the handle 142 that projects downwardly, as seen in Fig. 3, through helical slot 143 in cover 144 enclosing the shifter mechanism. The handle carries a flat, curved spring 145 which bears against cover 144 and has at each end a positioning indentation 146 respectively engaging with the enlarged ends of slot 143 to serve as limits for the handle movement. By moving the handle 142 forwardly or backwardly, as the case may be, the shifter sleeve 134 moves inwardly or outwardly, in accordance with the position of the guide pins 136 in the slots 135. As this sliding movement of the shifter 134 occurs, rollers 138 will cause collar 139 to follow the shifter inwardly or outwardly, and with it the main drive shaft 31. Referring now to Fig. 1, the inward or outward position of the shifter mechanism will determine whether mitre gears 35 are engaged to drive spur shaft 32 and its associated spool drive, or mitre gears 36 are engaged to drive spur shaft 33. In this way driven spool 15 or driven spool 16 becomes the take-up spool and the opposite spool becomes the free or feeding spool.

Mounting of arms

The main arms 13 and 14 of the attachment are alike in construction so that only one needs to be described. It consists of a flat side plate 147 (Fig. 1) with a wide top and front flange 148, a narrow bottom flange 148a, and a sleeve 149 secured in an opening near the rear thereof. It will be noted that the forward end of each arm terminates in a depending nose portion 150 in which the flanges are cut away (Figs. 3 and 4) to provide an opening therethrough for the passage of the ribbon. It also will be noted that the bottom edge of this nose portion 150 is shaped on an arc which is concentric with and substantially conforms to the curvature of the platen of the typewriter.

The sleeve portions 149 of the spool carrying arms 13 and 14 are fixed upon the tube sections 151 and 152, respectively, comprising housing 10, in any suitable way, as by screws 153. Tube 152 has a reduced extension 154 which telescopes within the tube 151 and tube 151 is provided with a slot 155. Lateral adjustment of the tubular portions 151 and 152, to accommodate the attachment to different lengths of typewriter carriages, is provided by the screws 156 which pass through the slot 155 and connect the tube sections together in the adjusted width.

Figure 13:
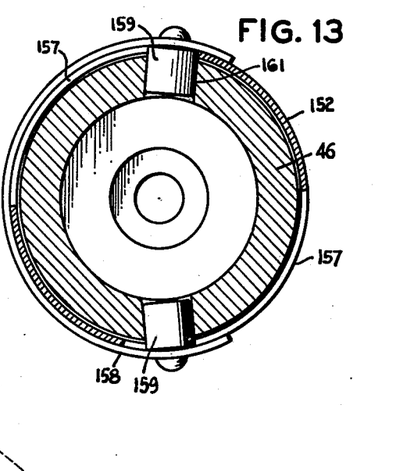
Fig. 13 is an enlarged sectional detail illustrating the pivotal mounting of the arms of the attachment.
Figure 14:
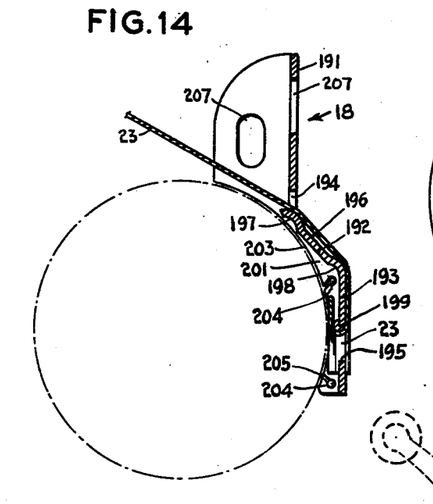
Fig. 14 is an enlarged sectional detail of one of the ribbon guides.

The enlarged outer ends of the tubular sections 151 and 152 fit over and are rotatable on the enlarged heads 46 and 132 of the main bearing housings respectively mounted in backing plates 41 and 42. For this purpose each enlarged end of the tubular sections 151 and 152 is provided with a pair of straight slots 157 (Fig. 13) on opposite sides thereof, and a spring clamp 158 carries near the inner ends thereof pins 159 which respectively engage in the slots 157. The pins 159 seat in suitable cavities 161 in the heads of the main bearing housings. Since the arms 13 and 14 are fixed upon the telescoping tubes 151 and 152, which are in turn fixed together, lifting either arm 13 or 14 will cause the pair of arms to pivot as a unit from the horizontal operating position to an upright non-operating position. This pivoting is around the fixed main bearing housings, and the location and length of the slots 157 will determine the upright position of the arms 13 and 14. This non-operating position preferably is slightly rearward of the vertical axis intersecting the drive shaft 31.

Ribbon spool

Referring now to Figs. 1, 9 and 10, the ribbon spools are slidably and frictionally mounted on drum 168. It will be understood that the spools are similarly mounted, and since both mountings are alike, only one need be shown. Rim 171 of the drum 168 has a lead-in groove 172 depressed therein, which extends from and opens at the edge of the drum that is remote from arm 13. Groove 172 is V shaped and terminates at its apex in a further depression 173. The latter depression is located between the inner and outer edges of the rim of the drum.

The spool is made from two parts 174 and 175, each comprising a central hub portion and a side flange. The hub portions interfit and are suitably secured together. The hub portion of part 175 has a cut-out tongue 176 extending inwardly and having near its free end an inwardly projecting button 177.

In the assembly of the spool upon its mounting and driving drum 168, spool button 177 is aligned with drum groove 172, whereupon a simple pushing of the spool will complete the mounting thereof. Button 177 will move along groove 172 and be directed into the depression 173, these elements being so related that when the button is seated in the depression the spool is properly aligned with the ribbon guides, about to be described. Furthermore, the friction connection between the button and its seat in the drum will be sufficient to cause the spool to follow the drum both when the spool is functioning as a take-up spool, and also as a free, feeding spool. Similarly, a simple pull upon the spool will remove the spool from its drum whenever that is desired, as when changing ribbons.

In certain circumstances, it may be desirable to attach a length of flat spring 181, similar to a section of clock spring, to the hub of the spool. To this end, the hub of the spool is provided with one or more struck-up attaching hooks 182, and spring 181 has a hole near its inner end in which the hook is received. A few turns of spring 181 are formed around the hub of the spool and the free end of the spring has a hook thereon to which the end of the inked ribbon 23 is attached. The functioning of this spring will be described in the course of the description of the operation of the attachment.

Features of construction of the ribbon spool are fully described and claimed in my co-pending application Serial No. 39,334, filed July 17, 1948 and now abandoned.

Ribbon guides

Ribbon guides 17 and 18 function to hold a span of ribbon exposed across the writing line of the platen, as well as to guide and direct the ribbon in its movements back and forth between the ribbon spools. An important desideratum in the construction and design of these guides is the reducing of drag on the movements of the ribbon through the guides, and the specific features of construction of the ribbon guides shown in this application are fully described and claimed in my co-pending application Serial No. 39,335, filed July 17, 1948.

Ribbon guides 17 and 18 are generally similar in shape and construction, and are shown in Figs. 1-4 and Fig. 14. Each has an upper vertical portion 191, a forwardly and downwardly inclined offset portion 192, and a lower vertical portion 193. Each has a horizontal ribbon slot 194 in its upper portion and a diagonal or forty-five degree ribbon slot 195 in its lower portion. In each guide the inclined offset has a struck out portion 196, over which the ribbon passes in its movement between the slots, a raised and rounded edge 197 at the bottom of horizontal slot 194, and a raised and rounded edge 198 at the junction of the offset portion 192 and the lower portion 193. In addition, the upper edge of diagonal slot 195 has a bead 199 on the rear face of the guide.

Each of the ribbon guides has a rearwardly extending flange 201 along its entire outer edge and another such flange extending part way along its inner edge. The upper part of flange 201 is wide for the mounting of the guide on the attachment arm, and the edge of the lower portion of this flange is arcuate, as seen at 203 in Figs. 3 and 4 and 14, the arc being concentric with the platen and the radius slightly greater than that of the platen.

In the illustrated embodiment the ribbon guides also support protective wires, about to be described, for which purpose flange 201 has a pair of spaced apart holes 204, which are preferably equi-distant from the arcuate portion 203 of the flange and may have communicating slots 205.

The ribbon guides are mounted on the forward ends of arms 13 and 14 by means of screws 206 (Figs. 2-4), and the flange 201, as well as the face of the guide, may have elliptical mounting holes 207 whereby the guides may be vertically adjusted, if necessary to properly locate the ribbon with respect to the writing line of the platen.

Protective devices

In order to prevent the ribbon that is stretched between the ribbon guides from "creeping" with the paper as it is moved relatively to the platen, and also to aid in preventing smudging of the pages by the supplemental ribbon as it is moved from one spool to the other, the attachment is provided with wires 21 and 22 which stretch between the ribbon guides above and below the ribbon and in line therewith when the supplemental ribbon is in writing position.

In this embodiment, and referring to Figs. 2, 3, 14 and 15, the wires 21 and 22 are formed from one U-shaped piece anchored at its mid-point in left hand ribbon guide 17 and having the open ends of the U extending through the outer flange of right hand ribbon guide 18. The free ends of the wire are suitably secured to the outer ends of a spring mounting 209 so that the wires are always maintained under tension. The spring mounting has a flat central part which bears against the side of ribbon guide 18, and turned outwardly therefrom are a pair of ears 211 and 212, forming a clip for securing the same to the ribbon guide. For this purpose the outer flange of ribbon guide 18 has a slot 213 of a size to receive ear 211, and ear 212 engages the face of the ribbon guide when the spring mount is in position. The slot and its ear keeps the mounting from displacement about a horizontal axis and the combined action of the ears prevents displacement about a vertical axis, after the mounting is placed under tension by the wires.

The wire and mounting arrangements are fully shown and described in my co-pending application Serial No. 39,333, filed July 17, 1948.

Closure caps

The covers enclosing the mechanism are best disclosed in Figs. 1-4. It has heretofore been noted that the shifting mechanism 26 is enclosed by a dome shaped cap 144 which is detachably secured to the rim of backing plate 41; and that driving mechanism 25 is enclosed by a similar dome shaped cap 84 which is detachably secured to the rim of backing plate 42. Thus, for servicing purposes, the desired cap is removed and the enclosed mechanism is entirely exposed.

The step down gearing 37, 38, with its spindle bearings, etc., at the forward end of the attachment arm 13 are enclosed by a cover cap 251 the open end of which is flush with the outside of arm 13. The rear end 252 of cap 251, is reduced in size where it encloses the forward end of spur shaft 32 and its mounting. This cap is held in place by one or more screws 253 which engage in the end portion 93 of bracket 90.

The spur shaft and its mounting, etc., are enclosed by cap 254. The forward end of this cap passes through a suitable slot in the reduced end 252 of cap 251. The rear end 255 of spur shaft cap 254 is enlarged and is curved to nest upon and conform to the tubular housing part 151. This enlarged end also covers an opening 256 in the section 151 through which the bevel gear 35 may be inserted. This cap 254 may be held entirely by friction, or it may be provided with flanges and screws to attach the same to the arm 13, if desired. In any event the open side thereof is flush against the outside of arm 13.

The spindle and gearing for spool 16 on arm 14 are enclosed by a cap 258 which is similar in construction and mounting to the cap 251, and the spur shaft 33 with its mounting are enclosed by a cover cap 259, which is the counterpart of cap 254, and these caps are secured to arm 14 to enclose the mechanism on the right hand side of the attachment. It will be noted that, in this case, the main mounting brackets 11 and 12 are shaped to conform to the caps 254 and 259.

Ribbon anti-slack device

In devices of the character described, it sometimes happens that when the arms 13 and 14 are raised from the horizontal operating position to the upright non-operating position a rotation of the engaged mitre gears will be set up which is in the reverse direction to the take-up drive, so that such raising of the arms will "drive" the take-up spool in such reverse direction and cause a slackening of the ribbon tension, and even a paying-out of the ribbon sufficiently to cause the ribbon to sag between the ribbon guides 17 and 18; and it sometimes occurs that such slack in the ribbon is not fully taken up when the arms are returned to the horizontal operating position.

Figure 16:
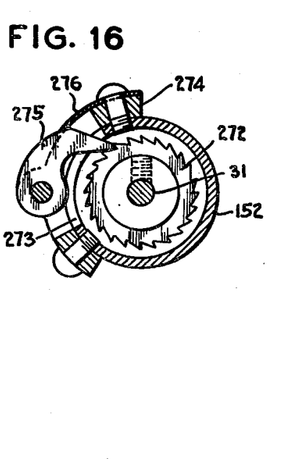
Fig. 16 is an enlarged detail in section on line 16—16 of Fig. 1.

To overcome this difficulty I provide the attachment with mechanism shown in Fig. 1 and in enlarged detail in Fig. 16. This consists of a ratchet 272 secured to the main drive shaft 31, the teeth of which ratchet face in the same direction as the teeth of the main drive shaft ratchet 75. The tubular housing portion 152 has a slot 273 therein which registers with the ratchet 272. A curved frame 274 is secured upon the outside of the tubular housing adjacent the slot 273 and has pivotally mounted therein a pawl 275 which extends through the slot into engagement with the teeth of ratchet 272. A spring 276 is mounted on the frame 274 so as to bear against the top of the pawl 275 and hold the same in engagement with the ratchet teeth. With this construction, the pawl 275 will follow the rotational movements of the tube 152 and such rotation occurs whenever the arms 13 and 14 are raised from the horizontal to the upright position. Thus, the raising of the arms causes a rotation of the main drive shaft 31 in the same direction as the normal drive therefor, and whichever set of the mitre gears is engaged drives the associated spur shaft to rotate its spool sufficiently to prevent any slackening of the tension in the ribbon between the ribbon guides 17 and 18. The anti-slack arrangement is shown and described in my copending application Serial No. 41,193, filed July 29, 1948.

Automatic paper bail

Figures 17, 18:
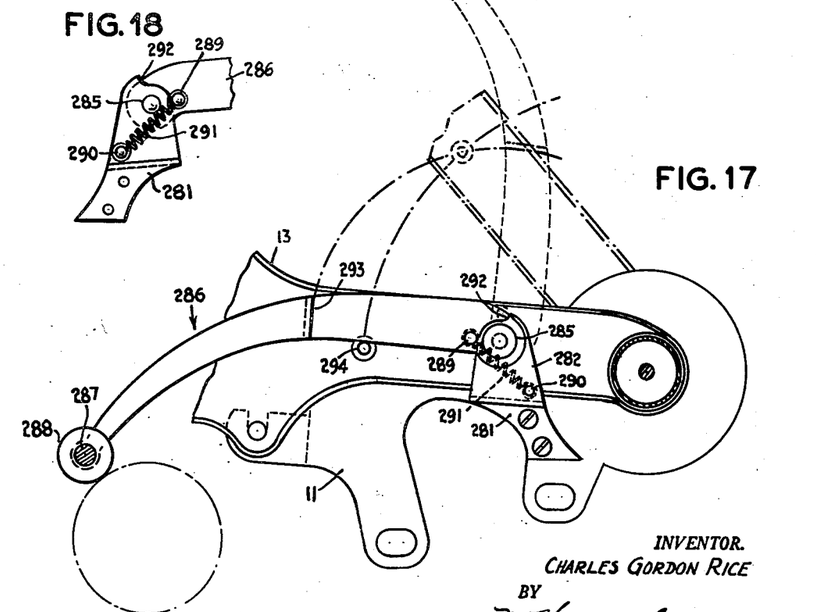
Fig. 17 is a side view of the bail and its mounting, looking in the direction of arrow 17 in Fig. 1.
Fig. 18 is a fragmentary detail of the bail mounting, looking from the opposite direction of Fig. 17.

This bail is seen in Figs. 1–4 and in detail in Figs. 17 and 18. Extending inwardly from mounting plate 11 is a bracket 281 having an upturned flange 282, and extending inwardly from mounting plate 12 is a similar bracket with an upturned flange 284. A paper engaging bail is pivotally mounted upon the flanges 282 and 284, by means of the studs 285, so that the bail may pivot between a horizontal operating position and an upright non-operating position. This bail consists of a pair of forwardly extending side arms 286 which are joined at their forward ends by the rod 287. Suitable friction rollers 288 are rotatably mounted on the rod 287.

The bail arm 286 carries a pin 289, located forwardly of the pivot 285, and the flange 282 carries a pin 290, which is located rearwardly of and below the pivot 285. Pins 289 and 290 are constructed to hold the ends of coiled spring 291 connected therebetween. As will be understood from the relationships of these pins, the spring 291 will exert a pressure downward when the bail is in the horizontal position, where the rollers 288 are in engagement with the paper on the typewriter platen, and a rearward pull when the bail is in its upright position, the pin 289 having moved about the pivot 285. The flanges 282 and 284 are provided with a suitably located stop 292 with which pin 289 engages when the bail is in its upright position.

As will be noted from Fig. 1, bail arms 286 have inwardly offset portions 293, and the arm 13 has a pin 294 secured thereto and projecting inwardly, the location of the pin 294 being such that when the arms 13 and 14 and the bail are in their horizontal or operating positions the pin 294 extends beneath the associated bail arm 286. When the arms 13 and 14 of the attachment are raised, as when moving the arms from the operating to the non-operating position, pin 294 will simultaneously and automatically lift the bail to follow the movement of the arms 13 and 14. As will be understood from Fig. 17, the offset portion 293 and the pin 294 are so located that the pin will continue to move the bail upwardly with the arms 13 and 14, until such time as the pin 289 passes over the center of action of spring 291 whereupon the spring will complete the movement of the bail to its upright non-operating position against stop 292.

It will be noted that when the arms 13 and 14 are in their fully raised non-operating position the pin 294 has then passed beyond the arc of movement of the offset portion 293 of the bail arm. If, thereafter, it should be desired to move the bail arm downwardly to an operating position, where the rollers 288 are against the platen, the offset portion 293 will permit the pin 294 to pass for this purpose. Conversely, the bail may be manually returned to its upright non-operating position even though the arms 13 and 14 of the attachment are also in the non-operating position without interference. On the other hand, should the bail be in its horizontal operating position and an attempt made to lower the attachment arms 13 and 14 to their horizontal position, pin 294 will then engage the top of bail arm 286 and prevent such lowering until the bail is first moved to its non-operating position. Thereby, the possibility of damage to the protective wires 21 and 22 by engagement thereof with the rod 287 or the rollers 288 is avoided. When both the bail and the attachment arms are in their upright non-operating positions, the attachment arms may be lowered and the ribbon properly positioned between the pages on the platen, after which the bail may be lowered to its operating position.

Operation

As explained above, the fixed mounting plates for the attachment are secured to the ends of the carriage so that the arms 13 and 14 of the attachment, and their ribbon spools and ribbon guides, are located near the extreme ends of the carriage, thereby preserving approximately all of the available writing area of the platen, in accordance with the design of the particular typewriter. Furthermore, the mounting of the attachment is done by the use of screws and bolts which are part of the construction of the typewriter carriage, and without alteration of or addition to the carriage, and the brackets are so shaped that none of the normal control levers, and the like, are modified or any of their operations interfered with.

To condition the attachment for use, a filled ribbon spool will replace spool 16, and one end of ribbon 23 will be attached to the end of spring 181 on that spool. The other end of the ribbon is then threaded through the ribbon guides 17 and 18, passing outwardly through the horizontal slot 194 in ribbon guide 18, inwardly through the diagonal slot 195 thereof, thence behind the ribbon guide 17, outwardly through its diagonal slot 195 and inwardly through its horizontal slot 194, where this other ribbon end is attached to the end of spring 181, which is on spool 15. Assuming that the shifter lever 142 is in the proper position to engage mitre gears 35 and to disengage mitre gears 36, the spool 15 will be driven as the take-up spool and spool 16 will be free to rotate to feed the ribbon as it is taken up on spool 15. It will be evident that there will be an exposed stretch of ribbon between the ribbon guides.

Attention is called to the fact that the button 177, on the hub of each spool, engaging in depression 173 in the respective mounting and driving drums 108, properly locates each spool so that the ribbon will be in alignment with the slots in the ribbon guides, whereby the ribbon will move through the guides without friction caused by contacting the sides of the slots. Again, the provision of the rounded surfaces 197, 198 and 199 on the ribbon guides reduces the area of contact between the ribbon guides and the ribbon to minimize the frictional drag on the ribbon as it is moved from one spool to another.

The exposed stretch of ribbon between the ribbon guides must be properly positioned with respect to the writing line of the platen of the particular typewriter upon which the attachment is being mounted, and also must be properly spaced from the platen. To this end, the elliptical mounting holes 11b and 12b in the main brackets 11 and 12 allow the positioning of the ribbon guides a few thousandths of an inch from the platen, and the elliptical mounting holes 207 in the ribbon guides allow for the proper vertical adjustment and alignment of the guides. When the guides are properly adjusted, the ribbon, as well as the protective wires 21 and 22, will be so located that a sheet of paper will pass freely between the platen and the ribbon and wires.

Assuming that the end of cable 27 has been attached to the typewriter frame near the center thereof, as indicated, the attachment is ready for use. The arms 13 and 14 are raised to the upright, non-operating position and the sheets of paper are threaded about the platen in the usual way. Assuming that three copies are to be made, the arms of the attachment are lowered and the exposed stretch of ribbon is placed between the second and third pages, after which the paper bail 286 is lowered into engagement with the top sheet of paper, in the usual way.

At this time it should be noted that each time the arms 13 and 14 are lowered to the horizontal operating position, means are provided to insure accurately locating the exposed stretch of ribbon with respect to the writing line of the platen. The mounting plates 11 and 12, respectively, carry on their forward ends extensions 295 and 296 (Figs. 3 and 4) each of which extensions has a socket groove 297 open at the top of the extension. Each arm 13 and 14 carries a locating stud 298 which is shaped with a circumferential, somewhat V-shaped, channel 299 (Figs. 1 and 2) to direct the studs into the respective sockets 297, thereby locating the arms 13 and 14 in their proper horizontal or operating positions.

After the attachment is in its operating position, the operator types in the normal way, whereupon the usual typewriter ribbon will record impressions on the first page, as is usual, and simultaneously the supplemental ribbon 23 will record impressions on the second and third copies. In this example, the record on the second page will appear on the reverse side of the page which, being a clear inked impression, can be read easily through a transparent or a translucent sheet, such as so-called "onion skin" paper. The record on the third sheet will be on the face of the sheet, the same as on the first sheet.

During the typing of the line, the supplemental ribbon has been stationary, and the spring drum 51 has been winding the cable 27 thereon. As the carriage is returned to start a new line of writing, the cable is pulled off the drum which moves the drum in a clockwise direction, in the illustrated construction, and will cause pawl 81 to drive ratchet 75. This will rotate main shaft 31, so that the engaged pair of mitre gears 35 will drive ribbon spool 15 to take-up ribbon, drawing the same through the ribbon guides from off spool 16. Thus, a "fresh" portion of ribbon is brought into the exposed strip, and a used portion thereof is wound onto the take-up spool. The length of such portions will depend to some extent upon the attached position of the clip 28 holding the end of the cable on the frame of the typewriter. In any event, it will be sufficient length that there will be no noticeable unevenness in the records on the second and third sheets, and the ribbon will have ample opportunity to "recuperate" so that the same areas may be used repeatedly. The presence of the wires 21 and 22 between the sheets aids in decreasing frictional drag of the ribbon upon the pages, as well as preventing smudging of the sheets by the moving ribbon. In addition, as the platen is rotated to advance the sheets for a new line of writing, the wires will overcome any tendency of the ribbon to follow the sheets and, similarly, should the platen be rotated backwards.

When the ribbon is completely unwound from spool 16 the above described return movement of the carriage will begin to unwind the spring 181 from the spool. This will introduce a different "feel" in the normal carriage return movement and will serve as a "telltale" to the operator to move the shift lever 142, thereby reversing the drive by bringing mitre gears 36 into engagement and disengaging mitre gears 35, and reversing the condition of the ribbon spools, making spool 16 the take-up spool and spool 15 the free or feeding spool. Should spool spring 181 become further unwound from the free spool, it will engage the inside of the nose portion 150 of the arm and serve as a shock absorber resisting efforts to return the carriage to start a new line of writing, and thus the parts of the attachment are protected from strain and damage. The end of the spring can be threaded through the horizontal slot of the associated ribbon guide, when a new ribbon is being inserted in the attachment, the spring then acting to lead the ribbon through the slot and on to the spool. The supplemental ribbon will move back and forth between the spools until it is entirely used up, whereupon the ribbon will be replaced, just as in the case of the usual typewriter ribbon.

At any time that it is desired, the attachement arms 13 and 14 may be raised from the horizontal operating position to an upright non-operating position and, as explained, this action will automatically raise the paper bail to its non-operating position. In the non-operating positions, both the attachment and the bail are out of the way so that the typewriter can then be used for other writing purposes, and the arms and bail will remain in the upright positions. Or, if desired, the bail can be lowered independently of the arms of the attachment. Of course, the bail need not be part of the attachment, although in certain cases there is an advantage thereto.

Also as pointed out above, the raising of the attachment arms has operated the anti-slack pawl 275 and ratchet 272, so as to maintain the ribbon tension and to keep the ribbon between the wires 21 and 22 while the arms of the attachment are in the upright position.

In the specification, I have explained the principles of my invention and the best mode in which I have contemplated applying those principles, so as to distinguish my invention from other inventions; and I have particularly pointed out and distinctly claimed the part, improvement or combination which I claim as my invention or discovery.

While I have shown and described certain preferred embodiments of my invention, it will be understood that modifications and changes may be made without departing from the spirit and scope thereof, as will be clear to those skilled in the art.

I claim:

1. In mechanism of the class described, a pair of mounting brackets adapted to be secured to the outer side faces of and extend part way along the outer side faces of opposite ends of a typewriter carriage, right and left hand arms carried by and paralleling said mounting brackets respectively, ribbon spools and ribbon guides carried by the forward ends of said arms so as to locate an exposed area of ribbon in front of the typewriter platen, paper separators carried at the forward ends of said arms, a housing joining said arms at the rear for unitary motion, said arms and said housing being pivotally mounted at the rear of said brackets for swinging movement from an operating position to a stand-by position, and means for selectively driving said ribbon spools.

2. In mechanism of the class described, a pair of mounting brackets adapted to be secured upon the outer faces of opposite ends of a laterally movable typewriter carriage by means of screws and bolts which are normally at opposite ends of a typewriter carriage, right and left hand arms pivotally carried by said mounting brackets respectively and extending close to such brackets, said arms being adapted to overlie the carriage end plates, slotted ribbon guides respectively mounted on the forward ends of said arms so as to be located in front of and close to the ends of a typewriter platen and adapted to hold an exposed length of inked ribbon along the writing line of the typewriter platen, ribbon spools carried by said arms, and means for alternately driving said spools to move the ribbon between said spools in response to the lateral movements of said carriage.

3. In mechanism of the class described, a pair of mounting brackets adapted to be secured to opposite ends of a typewriter carriage, right and left hand arms carried by said mounting brackets respectively, ribbon spools and ribbon guides mounted on the forward ends of said arms, drive mechanism mounted on one of said brackets for moving the ribbon between said spools, control mechanism for controlling the direction of ribbon feed and mounted on the other of said brackets, a tubular housing connecting said arms at the rear thereof, a main drive shaft within said housing and connected to the drive mechanism and the control mechanism, and selectively controlled driving means on each arm and extending from said main drive shaft to the associated ribbon spool.

4. Mechanism according to claim 3 in which said arms and said housing are pivotally mounted on said brackets for swinging movement from an operating position to a stand-by position.

5. In mechanism of the class described, a pair of mounting brackets adapted to be secured to the outer side faces of and extend part way along the outer side faces of opposite ends of a typewriter carriage and having elongated mounting openings permitting adjustment of said brackets forward and backward to accommodate said mechanism to typewriters varying in dimensions, right and left hand arms carried by said mounting brackets respectively, ribbon spools and ribbon guides on the forward ends of said arms, and arranged to hold a length of ribbon in front of said platen, and means for alternately driving said spools to move the ribbon between said spools in response to the lateral movements of said carriage.

6. Mechanism according to claim 5 in which said arms are joined together and are pivotally mounted on said brackets for swinging movement from an operating position to a stand-by position.

7. In mechanism of the class described, right and left hand arms pivotally mounted to move between a horizontal operating position and an upright non-operating position, a pair of ribbon spools carried by said arms, ribbon guides on the forward ends of said arms and arranged to hold a length of ribbon along the writing line of a platen, means for rotating said spools to move the ribbon through said guides, a pair of mounting brackets for said arms adapted to be secured to opposite ends of a typewriter carriage and arranged for adjusting the position of said arms to properly locate the length of ribbon with respect to the platen, a socket in at least one of said brackets, and a stud carried by its associated arm, the engagement of the stud in said socket determining that the length of ribbon is located along the writing line of the platen when the arms are moved to operating position.

8. Mechanism according to claim 7, in which the stud is formed with V-shaped groove arranged to guide said stud into engagement with said socket to accurately position the attachment in its operating position.

9. In mechanism of the class described, a pair of mounting brackets adapted to be secured to a typewriter carriage, right and left hand arms carried by said mounting brackets respectively, a pair of ribbon spools carried by said arms, ribbon guides carried on the forward ends of said arms, a tubular housing joining said arms together at the rear thereof, said housing being formed of two adjustably telescoping portions to permit adjusting the spacing between said arms, a drive shaft in said housing, spur shafts on said arms for driving the ribbon spools respectively, gears on said spur shafts, and gears on said drive shaft meshing with the first mentioned gears and being adjustably mounted on said drive shaft to permit adjusting the drive when the spacing between said arms is adjusted.

10. In mechanism of the class described, a pair of mounting brackets adapted to be secured to opposite ends of a typewriter carriage and having elongated mounting openings permitting adjustment of said brackets forward and backward to accommodate said mechanism to typewriters varying in dimensions, right and left hand arms carried by said mounting brackets respectively, a pair of ribbon spools carried by said arms, ribbon guides carried on the forward ends of said arms, said ribbon guides being adjustable vertically, a tubular housing joining said arms together at the rear thereof, said housing being formed of two adjustably telescoping portions to permit adjusting the spacing between said arms, a drive shaft in said housing, spur shafts on said arms for driving the ribbon spools respectively, gears on said spur shafts, and gears on said drive shaft meshing with the first-mentioned gears and being adjustably mounted to permit adjusting the drive when the spacing between said arms is adjusted.

11. In mechanism of the class described, a drive shaft adapted to be mounted on the carriage of a typewriter, a stationary bearing housing for said shaft, a drum rotatable on said housing, a spring within said drum biasing said drum for rotation in one direction, a pawl and a ratchet mounted on said drum and said drive shaft, and a cable wound on said drum having one end secured thereto and the other end adapted to be secured to a stationary element.

12. In mechanism of the class described, a drive shaft adapted to be mounted on the carriage of a typewriter, a stationary bearing housing for said shaft, a drum rotatable on said housing, a coiled spring within said drum biasing said drum for rotation in one direction, said spring being connected to said drum at its outer end and to said housing at its inner end, pawl and ratchet mechanism mounted on said drum and said drive shaft, and a cable having one end secured to said drum and wound thereon and the other end adapted to be secured to a stationary element.

13. In mechanism of the class described, a drive shaft adapted to be mounted on a typewriter carriage, a stationary bearing housing for said drive shaft, a drum rotatable on said housing and comprising separable members, a spring within said drum biasing said drum for rotation in one direction, said housing having a cavity therein, means detachably securing said spring at its outer end to said drum, a button on the inner end of said spring and loosely fitting in said cavity, pawl and ratchet mechanism mounted on said drum and said drive shaft permitting relative rotation thereof in one direction only, a cable having one end secured to said drum and wound thereon, and means at the other end of said cable for securing said other end to a stationary object.

14. In mechanism of the class described, a pair of mounting brackets adapted to be secured to a typewriter carriage, right and left hand arms carried by said mounting brackets, a pair of ribbon spools, ribbon guides on the forward ends of said arms, means joining said arms together at the rear thereof, a pair of bearings carried by said brackets, a rotatable and longitudinally shiftable shaft positioned in said bearings, operating connections between said shaft and said spools, drive mechanism for said shaft and mounted adjacent one end thereof, and shaft-shifting mechanism mounted adjacent the opposite end of the shaft and arranged to alternately effect the operating connections between said shaft and said spools.

15. In mechanism of the class described, a pair of mounting brackets adapted to be secured to a typewriter carriage, right and left hand arms carried by said mounting brackets, fixed bearings respectively associated with said brackets, a rotatable shaft mounted in said bearings, a pair of ribbon spools adapted to be alternately driven from said shaft, a shifter sleeve slidably mounted on one of said bearings, collar engaging members projecting from said sleeve, a collar fast on said shaft and receiving said members, and operating means including a cam for shifting said sleeve to move said shaft to alternately effect operation of said spools.

16. In mechanism of the class described, a pair of mounting brackets adapted to be secured to a typewriter carriage, right and left hand arms carried by said mounting brackets, fixed bearings respectively associated with said brackets, a rotatable shaft mounted in said bearings, a pair of ribbon spools adapted to be alternately driven from said shaft, a drive mechanism for said shaft comprising a drum rotatable on one of said bearings, a spring connected between said drum and said bearing for biasing the drum in one direction, a cable having one end connected to the drum and the other end arranged to be connected to a stationary part of the typewriter and adapted to rotate the drum in the opposite direction, a pawl and ratchet connection between the shaft and drum arranged to drive the shaft when the shaft is in either of two lateral positions, a shifter sleeve slidably mounted on the other of said bearings, collar engaging members projecting from said sleeve, a collar fast on said shaft and receiving said members, and operating means including a cam for shifting said sleeve to move said shaft to alternately effect operation of said spools.

17. In mechanism of the class described, right and left hand arms, ribbon spools and ribbon guides carried at the forward ends of said arms, each of said arms having a shaft-supporting bracket secured thereto, said bracket having front and rear facing bearing portions and the forward end of said bracket having a still further forwardly extending offset portion carrying a bearing the axis of which is at right angles to the axis of the said bearing portions, a bearing in each arm aligned with the last mentioned bearing, a spindle mounted in the two last mentioned bearings of each arm and carrying one of said spools, a spur shaft rotatably mounted in said bearing portions, and a gear connection between said spur shaft and spindle, respectively.

18. In mechanism of the class described, a pair of arms adapted to be mounted upon the carriage of a typewriter, a spindle rotatably mounted in each of said arms, a mounting and driving drum arranged to be driven by each spindle, and a ribbon spool having a hub fitting over and frictionally connected to each drum to be rotated thereby.

19. In mechanism of the class described, a pair of arms adapted to be mounted upon the carriage of a typewriter, a spindle rotatably mounted in each of said arms, mounting drums arranged to be driven by said spindles, each drum having a groove therein, and a ribbon spool for each drum having a hub fitting over said drum and an element engaging in said groove, each spool and drum rotating in unison.

20. In mechanism of the class described, a pair of arms adapted to be mounted upon the carriage of a typewriter, a spindle rotatably mounted in each of said arms, a mounting drum arranged to be driven by said spindle, a ribbon spool having a hub fitting over and frictionally connected to said drum to rotate therewith, means for rotating each said ribbon spool, and damping means within said drum for frictionally opposing rotation of said drum and spool.

21. Mechanism according to claim 20 in which said damping means comprises a coil spring within said drum having its opposite ends bearing on a fixed part and on said drum respectively.

22. In mechanism of the class described, a pair of arms adapted to be mounted on the carriage of a typewriter, a spindle rotatably mounted in each of said arms having means for driving the same and having an angularly shaped head, a drum mounted on the spindle and having an opening conforming to said head so as to be driven by the spindle, a ribbon spool having a hub fitting over said drum and frictionally connected to be driven thereby, means for rendering the spindle free of its drive, and a spring within the drum bearing at one end against a fixed part and at its other end against the drum for frictionally opposing rotation of said drum and spool when free.

23. In mechanism of the class described, a pair of spaced apart arms adapted to be mounted on the carriage of a typewriter, a pair of slotted ribbon guides mounted on said arms, a spindle rotatably mounted in each of said arms and having means for driving the same, a drum secured to each spindle so as to be driven thereby, a ribbon spool having a hub portion fitting over each drum so as to be rotated therewith, and locating means for accurately locating the spools upon the respective drums in alignment with the slots in the ribbon guides.

24. Mechanism according to claim 23 in which the locating means also constitutes a frictional drive connection between the spools and drums respectively.

25. In mechanism of the class described, a pair of spaced apart arms adapted to be mounted on the carriage of a typewriter, a pair of slotted ribbon guides mounted on said arms, a spindle rotatably mounted in each of said arms and having means for driving the same, a drum secured to each spindle so as to be driven thereby and having a guide leading inwardly from its inner edge and terminating in a locating element, and a ribbon spool having a hub portion fitting over each of said drums so as to be rotated therewith and having an element cooperating with said locating element whereby the spools are accurately aligned with the slots in the ribbon guides.

26. In mechanism of the class described, a pair of spaced apart arms adapted to be mounted on the carriage of a typewriter, a pair of ribbon spools mounted on said arms and having means for alternately driving the same, and a spring wound on each spool and adapted to have the end of a ribbon attached thereto.

27. In mechanism of the class described, a pair of spaced apart arms adapted to be mounted on the carriage of a typewriter, ribbon guides mounted on the forward ends of said arms and arranged to hold a length of ribbon in front of the platen of the typewriter, a ribbon spool on each arm and having means for alternately driving said spools to feed ribbon through said guides, and a spring wound on each spool and adapted to have the end of a ribbon attached thereto, said springs being of sufficient length to be at least partially unwound from the associated spool and to engage a portion of the arm upon which the spool is mounted.

28. In mechanism of the class described, a pair of mounting brackets adapted to be secured to a typewriter carriage, right and left hand arms pivotally carried by said mounting brackets respectively for swinging movement from an operating position to a stand-by position, ribbon guides mounted on the forward ends of said arms, a housing joining said arms together at the rear thereof, a bearing member carried by each of said brackets and having spaced apart openings, said housing having a pair of spaced circumferential slots registering with each of the openings, and a clip positioned outside said housing and having a pair of pins extending through said slots and into the openings in said bearing member, said slots having an angular length of slightly more than 90°.

29. In mechanism of the class described, a pair of mounting brackets adapted to be secured to a typewriter carriage, right and left hand arms pivotally carried by said mounting brackets respectively for swinging movement from an operating position to a stand-by position, ribbon guides mounted on the forward ends of said arms, a housing joining said arms together at the rear thereof, a member carried by each of said brackets and upon which the housing is pivoted, and a pin and slot connection between the housing and members permitting the pivotal movement of said arms and limiting the stand-by position of said arms.

30. In mechanism of the class described, a pair of mounting brackets adapted to be secured to a typewriter carriage, right and left hand arms pivotally carried by said mounting brackets respectively, ribbon guides on the forward ends of said arms and arranged to hold a length of ribbon in front of the platen of a typewriter, a paper bail pivotally mounted on said mounting brackets, and a connection between said arms and bail for simultaneously pivoting said arms and bail, said connection being disengageable so that the bail may be used independently of said arms.

31. In mechanism of the class described, a pair of mounting brackets adapted to be secured to a typewriter carriage, right and left hand arms pivotally carried by said mounting brackets respectively, ribbon guides on the forward ends of said arms and arranged to hold a length of ribbon in front of the platen of a typewriter, a paper bail pivotally mounted on said mounting brackets, a connection between said arms and bail for simultaneously pivoting said arms and bail, a pin mounted on said bail, a second pin mounted on one of said brackets below and behind the pivot point of said bail, a spring connecting said pins, and a stop for limiting the movement of the bail.

32. In mechanism of the class described, a pair of mounting brackets adapted to be secured to a typewriter carriage, right and left hand arms pivotally carried by said mounting brackets and arranged to be moved from a substantially horizontal operating position to an upright stand-by position, ribbon guides on the forward ends of said arms and arranged to hold a length of ribbon in front of the platen of a typewriter, a paper bail pivotally mounted on said mounting brackets and arranged to be moved from a horizontal operating position to an upright stand-by position, and a pin mounted on one of said arms in position to engage and lift the bail simultaneously with said arms as the arms are moved to stand-by position.

33. In mechanism of the class described, a pair of mounting brackets adapted to be secured to a typewriter carriage, right and left hand arms pivotally carried by said mounting brackets and arranged to be moved from a substantially horizontal operating position to an upright stand-by position, ribbon guides on the forward ends of said arms and arranged to hold a length of ribbon in front of the platen of a typewriter, a paper bail pivotally mounted on said mounting brackets and arranged to be moved from a horizontal operating position to an upright stand-by position, a pin mounted on one of said arms forward of the pivot point of said bail, and said bail having an offset therein so positioned with respect to said pin that said bail is engaged by said pin when the arms are raised but is clear of said pin when said arms are in stand-by position.

34. Mechanism according to claim 33 in which said pin projects so as to prevent the arms from being lowered to operating position in case the bail is already in its operating position.

35. In mechanism of the class described, mounting brackets for attachment to the ends of a typewriter carriage for supporting an attachment adapted to hold a length of ribbon in the writing area of a typewriter platen, said brackets comprising a unitary stamping having a depending flat plate area for mounting alongside the end plates of the carriage and having mounting holes for attachment of the brackets to the carriage, and said brackets each having a portion for the pivotal mounting of the attachment and a forwardly extending portion shaped to engage with the attachment to position the same with the length of ribbon in writing position.

36. Mechanism according to claim 35 in which said brackets form the sole support for said attachment.

37. In mechanism of the class described, a mounting bracket attachable to the end of the carriage of a standard typewriter, said bracket having depending leg portions in which are mounting openings, a forwardly extending projection formed into a socket to receive a positioning stud, and a circular portion at the rear with a central opening to receive a mounting bearing.

38. Mechanism according to claim 37 in which said bracket also has an outwardly projecting extension provided with an opening, and a cable receiving bushing mounted in said last mentioned opening.

CHARLES GORDON RICE.

References Cited in the file of this patent

UNITED STATES PATENTS

| Number | Name | Date |
|---|---|---|
| 1,266,038 | Mumm | May 14, 1918 |
| 1,682,333 | Hart | Aug. 28, 1928 |
| 1,942,722 | Mosfelt et al. | Jan. 9, 1934 |
| 1,955,372 | Thornblade | Apr. 17, 1934 |
| 1,961,455 | Robinson | June 5, 1934 |
| 1,968,814 | Atwood | Aug. 7, 1934 |
| 2,058,859 | Fried | Oct. 27, 1936 |
| 2,068,348 | Nelson | Jan. 19, 1937 |
| 2,069,277 | Sacerdote | Feb. 2, 1937 |
| 2,176,628 | Helmond | Oct. 17, 1939 |
| 2,244,229 | Almer | June 3, 1941 |

FOREIGN PATENTS

| Number | Country | Date |
|---|---|---|
| 345,469 | Great Britain | 1931 |
| 111,823 | Australia | 1940 |